United States Patent [19]

Sharafabadi

[11] Patent Number: 4,980,186

[45] Date of Patent: Dec. 25, 1990

[54] PSEUDOPLASTIC YELLOW MUSTARD GUM

[76] Inventor: Soheil K. Sharafabadi, Suite 808 400 Stradbrook, Winnipeg, Manitoba, Canada, R3L 2P8

[21] Appl. No.: 393,657

[22] Filed: Aug. 14, 1989

[51] Int. Cl.$^5$ .................... C08B 37/00; A23L 1/225
[52] U.S. Cl. .................... 426/425; 426/430; 426/431; 426/506; 426/511; 426/629; 426/655; 426/658
[58] Field of Search ............... 426/425, 429, 430, 431, 426/629, 658, 655, 506, 511

[56] References Cited

U.S. PATENT DOCUMENTS 3,615,648 10/1971 Barros ............................. 426/431

FOREIGN PATENT DOCUMENTS 671499 1/1963 Canada ............................. 426/431

OTHER PUBLICATIONS

Siddiqui et al., Food Microstructure (1986) pp. 157–162 "Mucilage in Yellow Mustard Seeds".
Bailey et al., Biochem. J. (1932), 26, pp. 1609–1623 "The Nature & Composition of the Seed of White Mustard (*Brassica alba*)".
Bailey, Biochem. J. (1935), 29, pp. 2477–2485 "Cress Seed Mucilage".
Hirst et al., Biochem. J. (1965) 95, pp. 453–458 "Seed Polysaccharides & Their Role in Germination".
Grant et al., Chem. Comm (1969) pp. 805–806 "Seed Mucilages as Examples of Polysaccharide Denaturation".
Weber et al., J. Food. Sci. (1974), 39, pp. 461–466 "Functional Characteriscs of Mustard Mucilage".
Vose, Cereal Chem., (1974) 51, 658–665 "Chemical and Physical Studies of Mustard & Rapeseed Coats".
Theander et al., J Agri Food Chem. (1977), 25 pp. 270–273 "Carbohydrates, Polyphenols & Lignin In Seed Hulls".
"Woods et al., Can J. Plant Sci. (1980) 60, pp. 1031–33 Mucilage From Yellow Mustard".

*Primary Examiner*—Donald E. Czaja
*Assistant Examiner*—Evan Federman
*Attorney, Agent, or Firm*—Robert W. B. Bailey

[57] ABSTRACT

An improved process of gum extraction from whole yellow mustard seed is described. The process is time temperature interdependent. In a first step the seed is treated in water, preferably at elevated temperature, the extract is then separated, preferably mechanically, more preferably by a perforated centrifuge, or even more preferably by a slitted centrifuge. The aqueous extract on precipitation and drying gives a gum with pseudoplastic properties similar to those of xanthan gum. The extraction using mechanical separation, especially by a perforated bowl centrifuge, which can be slitted, is suitable for industrial scale extraction of the yellow mustard seed. A centrifuge adapted for juice extraction is suitable. The gum produced under these conditions exhibits unique properties dramatically different from those reported from other previous processes, in both composition and viscosities.

20 Claims, 4 Drawing Sheets

PSEUDOPLASTIC YELLOW MUSTARD GUM

This invention relates to natural products from oilseeds. Especially it relates to extraction of gum from yellow mustard seed, including a suitable industrial process. Such extracts are called gums or mucilages, and are generally hydrocolloids containing polysaccharides. While such gums may be designated as specific to a particular plant species seed, in fact the composition depends to some extent on the method of extraction. The term "mucilage" describes a viscous gum of plant origin, forming a viscous aqueous solution. Mucilage may either refer to gum present in the seed or gum extracted from the seed, which varies with extraction method. In this application the word gum is used in preference to mucilage.

Mustard has two major commercial species, namely *Brassica juncea* (varieties Canadian brown, Stoke and oriental mustard) and *Sinapic alba*, also referred to as *Brassica hirta*, or *Brassica alba* (varieties white and yellow mustard).

BACKGROUND AND PRIOR ART

The Cruciferae family of plants includes several industrial oilseed crops. Oilseeds typically comprise an inner kernel, an outer hull, shell or husk, and a coating, gum is found in the hull and coating. Yellow mustard is one such variety, although more commonly used as a condiment than an oilseed. Yellow mustard seed contains glucosinolates which have thioglucoside groups, these are toxins, which regarded rendering the seed unfit for consumption, especially human. The presence of these thioglucoside groups presents problems in refining oil. Glucosinolates are both water and oil soluble.

Gum present in some of these oilseed crops also produces storage and extraction problems in the oilseed industry.

PRIOR ART YELLOW MUSTARD GUM EXTRACTIONS

Yellow mustard seed has been extracted in various ways on a laboratory scale, to analyze and identify the gum and its components. The results are not consistent.

Bailey et al. [Biochem. J. (1932) 26, 1609] and Bailey [Biochem. J. (1935) 29, 2477], extracted whole seed with cold water to obtain 2% gum, which was identified as including cellulose, and two acidic polysaccharides, each containing galactose, galacturonic acid and arabinose.

Hirst et al. [Biochem. J. (1965) 95, 453] extracted yellow mustard seed hulls and kernels separately using a sequential extraction scheme. Hull extraction gave 6.4% with cold water, boiling water then gave a further 8.6%. The cold water hull fraction polysaccharides after hydrolysis contained in rough order of concentration galactose, arabinose, and galacturonic acid, as major components and xylose, glucose and mannose as minor components. The hot water hull fraction polysaccharides after hydrolysis contained in rough order of concentration arabinose, galactose, and galacturonic acid, as major components and xylose, rhamnose, glucose and mannose as minor components. Kernel extraction gave 2.4% with cold water, boiling water gave a further 3.4%. The cold water kernel fraction polysaccharides after hydrolysis contained in rough order of concentration arabinose, and glucose as major components and xylose, galactose, and galacturonic acid as minor components. The hot water kernel fraction polysaccharides after hydrolysis contained in rough order of concentration arabinose as major component and xylose, galactose and galacturonic acid as minor components. A large scale extraction of the kernals produced a polysaccharide almost entirely composed of arabinose, yielding 6.3% with cold water, and boiling water gave a further 6.1%.

Grant et al. [Chem. Comm., (1969) 805] extracted yellow mustard seed with cold water to obtain gum, which appeared to consist of 50% cellulose solubilized by acidic polysaccharides. These polysaccharides included as components galacturonic acid, rhamnose, galactose, arabinose, and xylose.

Weber et al. [J. Food Sci. (1974) 39, 461] defatted yellow mustard seed hulls with a hexanye-ethanol-water mixture, then extracted the dried defatted residue with water at an undefined temperature. The extracted gum was precipitated by ethanol addition, in 15 to 25% yield, freeze dried and tested for rheological properties. The composition suggested by Bailey (above) was confirmed as an acidic polysaccharide comprising about 50% cellulose, 10 to 18% uronic acids, mainly galacturonic acid, including as well arabinose, xylose, and glucose in 5:2:1 ratio, two unidentified saccharides were also present. This gum was shown to be a hydrocolloid of thixotropic properties. comparable to guar, tragacanth, carrageen and karaya gums.

Vose [Cereal Chem. (1974) 51, 659] defatted hulls from mustard and rape (canola) species, followed by sequential extraction obtaining 22.6% gum with cold water, and a further 1.1% with hot water from yellow mustard seed, compared to 2.2 to 3.7% with cold water and a further 0.6 to 2.2% with hot water from brown mustard (*Brassica juncea* species), and 0.9 to 1.2% with cold water, and a further 1.0 to 1.3% with hot water from rapeseed (*Brassica campestris, Brassica napus*). Hydrolysis of the cold water gums showed that the brown mustard and rape gums were similar with arabinose (40 to 50%), xylose (18 to 25%), glucose (10 to 14%), uronic acids (6 to 12%), with traces of fructose, galactose, and rhamnose. Yellow mustard gum was about 35% hydrolyzable (1M sulfuric acid at reflux for 4 hours), the residue being cellulose, the hydrolyzable portion was galacturonic acid (30%), arabinose (20%), glucose (20%), xylose (6%), fructose (6%), rhamnose (6%). The hot water gums were similar. The viscosity of yellow mustard gum was much greater than those of brown mustard and rape, as was those of slurries prepared by milling whole hulls.

Theander et al. [J. Agri. Food Chem. (1977) 25, 270] extracted hulls of white mustard seed (similar to yellow mustard) with 80% ethanol to give chloroform and water soluble fractions, the water soluble fraction was further split into acidic, neutral, and basic fractions. The neutral unhydrolyzed water soluble fraction consisted mainly of sucrose, stachyose and fructose. The extracted hulls were further extracted with benzene-ethanol, to give polysaccharides, which were then hydrolyzed (12M sulfuric acid room temperature for 2 hours, then 0.358M sulfuric acid under reflux for 6 hours) and analyzed shown to consist of glucose 39.3%, arabinose 25.4%, galactose 17.9%, xylose 7.0%, mannose 5.4%, rhamnose 4.0%, fucose 1.0%, the uronic acids present were not identified, nor was their content measured.

Woods et al. [Can. J. Plant Sci. (1980) 60, 1031] extracted dried whole yellow mustard seed with water containing 0.25% volume chloroform, obtaining between 0.8 to 2% of gum, after precipitation with acidified acetone.

Siddiqui et al. [Food Microstruct. (1986) 5, 157] studied the surface of yellow mustard seeds using optical and electron micrographs, at the same time extracting the seeds. The hulls were extracted with boiling water for 35 min, then the filtered extract was precipitated with isopropanol to give one gum. Another was obtained by rubbing moistened whole seed, dissolving the product in water and precipitating with isopropanol. Hydrolysis of the polysaccharides of these gums showed they comprised in component molar order galactose, glucose, arabinose and mannose (roughly equal mole ratio), rhamnose and xylose, extracted gum contained about 30% uronic acid, compared to 18% for rubbed gum. The gums were concluded to include pectic polysaccharides. Differences in galactose:glucose ratios (depending on the acid concentration in the hydrolysis) were attributed to the presence of a xyloglucan (amyloid).

Reported gum yield varies depending on variety and location. The differences in gum extraction results are attributable to differential extraction of seed hull components, and varietal differences. However to date no industrial process for mustard gum extraction has been reported.

DESCRIPTION OF THE INVENTION

The object of the invention is to provide an improved process of extraction of yellow mustard seeds (some yellow mustard seed may be called white mustard seed, as there is no absolute distinction).

Applicant has discovered a novel process of extraction which gives a high viscosity nearly ideal pseudoplastic gum. This process is time-temperature interdependent.

The invention in one broad aspect comprises an improvement in a process of water extraction of gum from dried yellow mustard seed, the improvement comprising treating the mustard seed with water in at least a first step, and separating the resulting water extract from the seed in a second step. Applicant has found that mechanical separation, preferably by centrifugation, is advisable for an industrial process.

Preferably in one variation the first step comprising initially treating the mustard seed with water at elevated temperature, then extracting the whole seed with water cooled to room temperature. The first step may comprise initially treating the mustard seed at about 100° C. for about 5 minutes at a seed:water ratio of about 1:2.5, and the extraction takes place at room temperature at a seed:water ratio of about 1:7. More preferably the mustard seed is treated at about 75° C. for about 25 minutes at a seed:water ratio of about 1:2.5, after treatment at about 100° C. Optionally the process may include the additional step of treating the dried yellow mustard seed with steam, before treating the seed at elevated temperature with water.

The gum can be precipitated from the water portion by any water miscible alcohol, for example isopropanol or ethanol.

Four gums F1, F2, F3 and F4 were successively isolated in yields of 2.25%, 0.75%, 0.54%, 0.45% respectively for a total of 3.99%, overall, which is approximately twice that obtained previously from whole seed extraction. The four fractions were obtained after consecutive extraction periods of 16, 7, 17 and 24 hours respectively. Although this process is useful, and provides a useful product it is not easily adapted to industrial scale extraction, because of the long extraction time, and high seed:water ratio. Desirably an industrial process has as short extraction time and as low a seed:water ratio as possible.

In an especially convenient version, the second step comprises mechanically separating the seed and the water, preferably by centrifuging in a perforated centrifuge, which can also be a screened or slitted centrifuge. A slitted centrifuge is especially preferred, as the seed is less likely to plug the slits. The first step preferably comprises treating the seed at an elevated temperature, preferably at least about 550° C., which may be carried out at a seed:water ratio of about 1:2, preferably for about 10 minutes. Alternatively the elevated temperature may be 100° C., the seed:water ratio about 1:3, and the seed may be treated for about 2.5 minutes. The first step may be applied in a microwave oven, at a seed:water ratio of about 1:2, the temperature is raised from room temperature to about 85° C., in about 3 minutes. The first step may also take place at about 25° C., at a seed:water ratio of about 1:2, preferably for about 30 minutes. In this version an additional third step may comprise treating the resulting separated water extract at an elevated temperature. The first and second steps are preferably repeated, for example when the temperature is at least about 55° C., the first and second steps are preferably repeated four times and the resulting water extracts combined. When the temperature is 100° C. they are preferably repeated twice and the resulting water extracts combined. When the treatment is carried out in a microwave oven they are preferably repeated three times and the resulting water extracts combined. When the treatment is at room temperature (25° C.) the treatment may be repeated ten times, 10 minutes each.

The centrifuges considered appropriate for use in the process of the invention are selected from those centrifuges having perforated bowls, which may be perforated, slitted, or screened. As would be understood by those skilled in the art many such conventional centrifuges may be appropriately used in the process of the invention. Also as would be understood by those skilled in the art, equivalent conventional mechanical devices may be used in the process of the invention.

The results demonstrate that extraction could be satisfactorily carried out in the range 55° C. to 100° C. with numerous seed:water ratios. The short extraction time and low seed:water ratio is preferred in industrial application. The experiments also confirm that the extraction can be successfully carried out over the entire range of 55° C. to 100° C., and that extraction at other temperatures is feasible.

These treatments generated several gums, elevated temperature gums TC55, TC65, TC85, microwave oven gum MT85, high temperature gum TC100, low temperature gum TC25, and heat treated low temperature gum TC25+H, all in approximately 4% yield, with extraction times ranging from 5 to 130 minutes. TC25, TC65, MT85 were tested and found to have pseudoplastic properties, the higher temperature extracts being more viscous, more pseudoplastic and having less hysteresis. The gums obtained by high temperature extraction process were very viscous and comparable to xanthan gum, while the cold extracted gums were lower in viscosity, as shown in Tables II to IX.

In another broad aspect the invention is a yellow mustard seed gum, preferably highly viscous, having pseudoplastic properties. "Pseudoplastic" is defined in this application as having shear thinning properties, that is, as the shear rate increases the viscosity drops and the liquid thins. This is unusual in natural and other gums, over the broad range of shear rate. The only yellow mustard gum for which shear rate properties were measured was that extracted by Weber et al. (op. cit.) from the hulls, which was shown to have thixotropic properties, which are distinct from the pseudoplastic properties shown by the gums of this application. The seven tested gums, all exhibit nearly ideal viscosity/shear rate relationships expected for an ideal pseudoplastic material. The utility of such a pseudoplastic material is widespread as a viscosity changing additive, especially in food and pharmaceuticals. The currently used additive is xanthan gum, a biosynthetically prepared polysaccharide, which is widely used for viscosity effects. The gums of this invention would be superior, as they are already known to be used in foods and condiments, since the dawn of civilization, and probably substantially earlier.

The gum may be in clear white dry fibrous form. The gum includes a polysaccharide, having monosaccharide components, which comprise in order of decreasing concentration glucose, galactose, mannose, arabinose, with rhamnose and xylose approximately equal in concentration but less than arabinose. The rhamnose may be greater in concentration than the xylose, or the xylose may be greater in concentration than the rhamnose, they also can be equal in concentration. The polysaccharide may have a monosaccharide composition by weight of xylose 3.03 to 3.67%, rhamnose 3.38 to 3.85%, arabinose 5.27 to 7.02%, mannose 10.43 to 10.72%, galactose 31.47 to 33.29%, glucose 42.23 to 45.53%.

In a further aspect the invention is directed to the water extracted, yellow mustard seed, having a sweet pleasant taste. Heat extracted seed was found to have a sweet pleasant taste, while cold extracted seed had an associated bitter taste, presumably caused by natural toxins present.

It is tendered as a non binding hypothesis by applicant that the glucose represents the cellulosic backbone of the polysaccharide, while the residual components represent polysaccharide chains grafted to the backbone, oligosaccharides grafted to the cellulose backbone, and possibly polysaccharides, oligosaccharides, and monosaccharides adsorbed onto the polysaccharide, it is also possible that the polysaccharide was synthesized in some way by the heat treatment from smaller units to form an elongated polysaccharide.

DESCRIPTION OF PREFERRED EMBODIMENTS

Properties of preferred embodiments are indicated in the drawings where.

The general description of the invention is now expanded by reference to the experimental results, which illustrate preferred embodiments of the invention.

In Table I, the chemical properties of the extracted gums (F1, F2, F3, F4) are given together with that of Siddiqui et al., (PA - prior art).

TABLE I

YELLOW MUSTARD GUM COMPOSITIONS
(Sugars are weight % of total identified sugars except PA which is molar %)

| Constituent | F1 | F2 | F3 | F4 | PA |
|---|---|---|---|---|---|
| Xylose | 3.03 | 3.24 | 3.38 | 3.67 | 3.75 |
| Rhamnose | 3.85 | 3.67 | 3.38 | 3.52 | 6.10 |
| Arabinose | 7.02 | 6.91 | 5.28 | 5.27 | 11.71 |
| Mannose | 10.59 | 10.72 | 10.43 | 10.54 | 11.24 |
| Galactose | 33.29 | 32.29 | 32.16 | 31.47 | 37.24 |
| Glucose | 42.23 | 43.16 | 45.37 | 45.53 | 29.98 |
| Protein | 8.40 | 7.10 | 7.20 | 9.10 | 6.10 |
| Yield % | 2.25 | 0.75 | 0.54 | 0.45 | |

Four other unidentified sugars were noted as present in minor amounts.

Tables II to IX present viscosity measurements for mustard gums extracted under specific extraction conditions together with those of xanthan gum for comparison. These tables show mustard gum is very viscous and comparable to xanthan gum.

Figure 1:
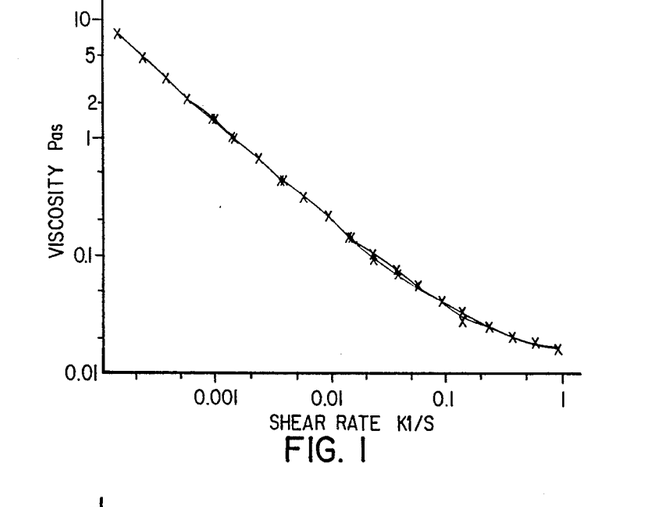
FIGS. 1 to 4 show plots of viscosity vs shear rate for gums F1, F2, F3, and F4, respectively.
Figure 2:
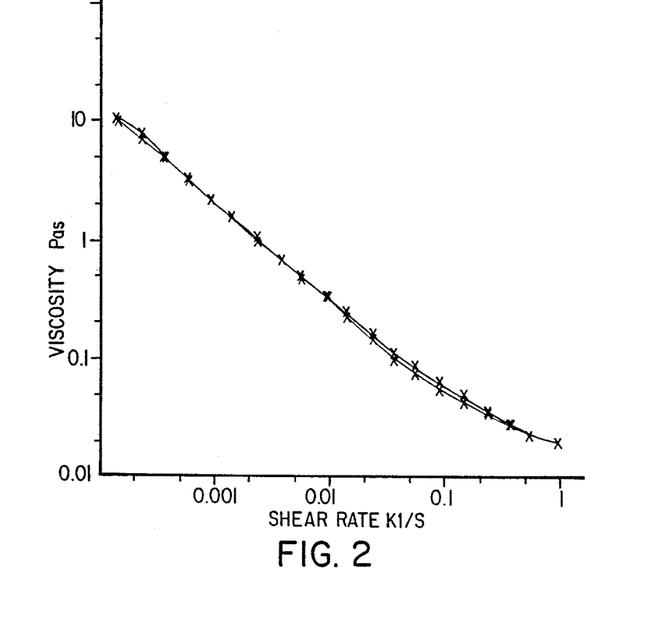
Figure 3:
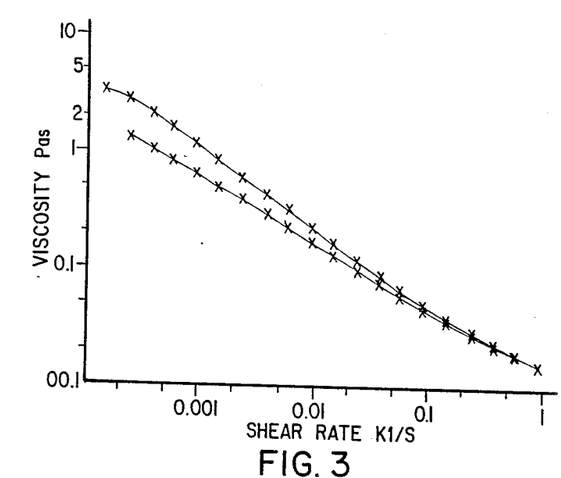
Figure 4:
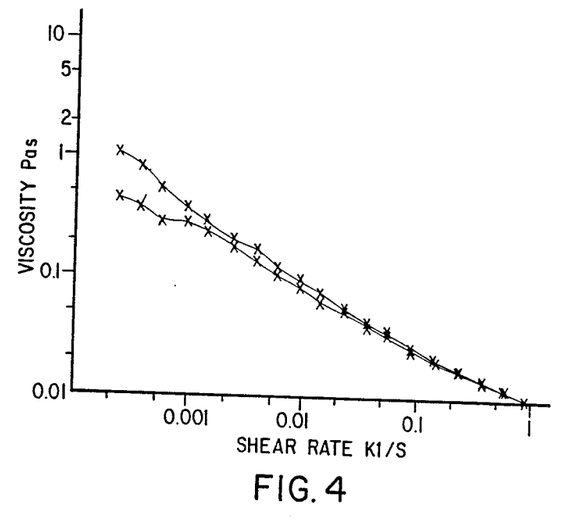

FIGS. 1 to 4 show log plots of viscosity vs shear rate for gums F1, F2, F3, and F4. Although not identical, all clearly demonstrate nearly ideal pseudoplastic behavior, exhibiting similar viscosity—shear rate relationships. These figures show that yellow mustard gums are highly viscous, which has never been reported before.

Figure 5:
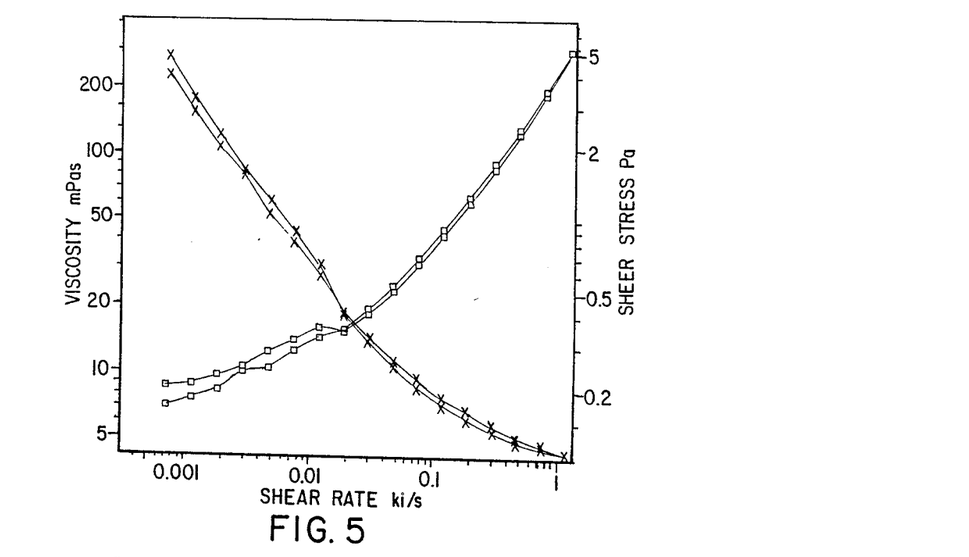
FIGS. 5 to 8 show plots of viscosity vs shear rate (X) and shear stress vs shear rate (O) for gums TC25, TC65, MT85, and xanthan gum (prior art), respectively.
Figure 6:
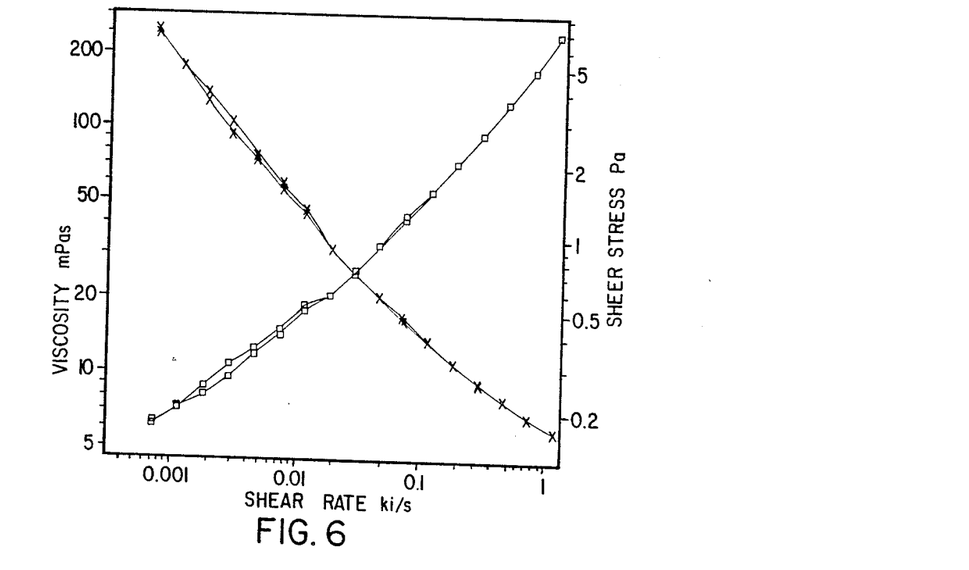
Figure 7:
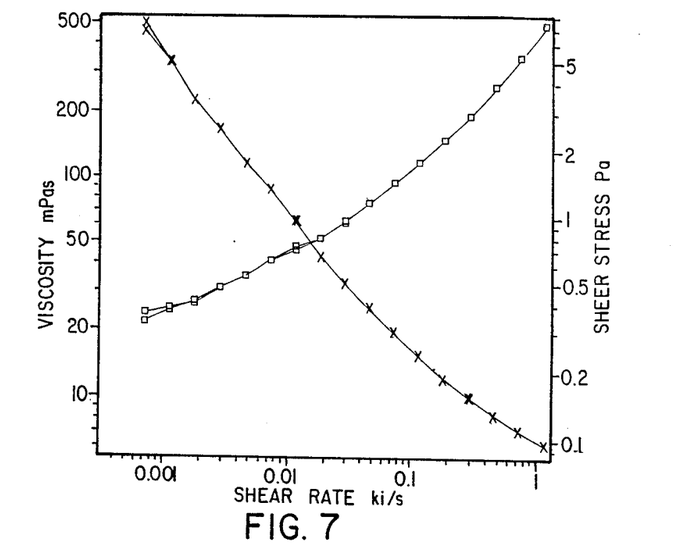
Figure 8:
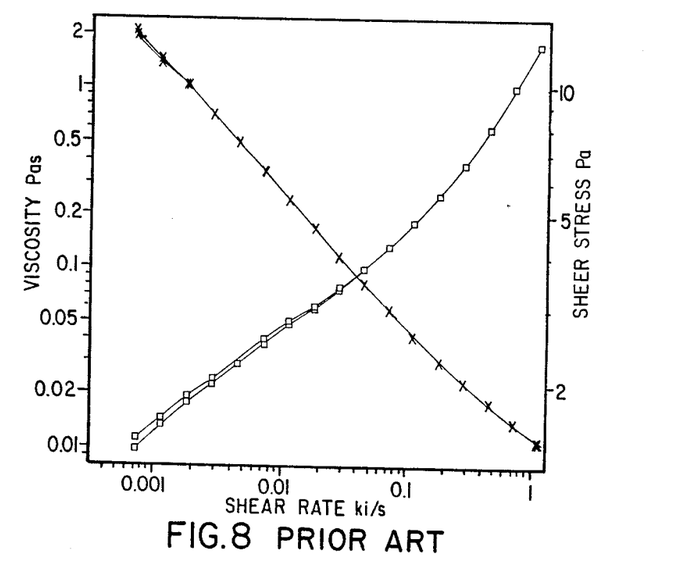

FIGS. 5 to 8 show log plots of viscosity vs shear rate (X) and shear stress vs shear rate (O) for gums TC25, TC65, MT85 and xanthan gum. Although not identical, all clearly demonstrate nearly ideal pseudoplastic behavior, exhibiting similar viscosity—shear rate relationships. TC65 and MT85, the heat treated extracts, exhibit nearly ideal pseudoplastic behavior comparable to that of xanthan gum, with virtually minimal hysteresis. By comparison TC25, the cold extract, is of lower viscosity, and exhibits more hysteresis. MT85, the microwave extract, shows higher viscosity and less hysteresis than TC65.

The figures indicate that all mustard gum samples have shear thinning properties and nearly ideal pseudoplastic behavior.

Heat extracted seed was found to have a sweet pleasant taste, while cold extracted seed has an associated bitter taste, presumably caused by natural toxins present.

EXPERIMENTAL DETAILS

Throughout, the term "seed" refers to whole seed.

Experiment 1: Extraction of Gum

First Extraction 250 ml of boiled distilled water, at 100° C., was added to 100 g of dried yellow mustard seed in a flask, and the container maintained at 100° C. for 5 min. The container was cooled to 75° C., and was maintained at this temperature for 25 min. The container was then cooled to 25° C. and 450 ml of cold (room temperature) distilled water was added to adjust the seed:water ratio to 1:7. 2 ml of chloroform was added to prevent microbial fermentation. The seed was then stirred in the water using a magnetic stirrer for 16 hours at room temperature. The viscous aqueous liquid containing the extracted material was then strained through a strainer, to separate the gum from the seed to yield about 500 ml of viscous aqueous liquid. The dried seed tends to absorb at least its own weight of water during the process. The aqueous extract was then treated by addition of 4 volumes of 95% ethanol (2 1), and stirred with a glass rod to recover the gum in a cotton like mass which easily separates from the soluble matter. In this process the precipitated gummy material aligns in the direction of shear to produce a cottony form of the gum. After separation of the gum from the liquid, the cottonlike fibrous appearing mass, was pressed to remove solvent. The gum was then dissolved in 50 ml of water and reprecipitated by 200 ml of ethanol. This precipitate was then filtered, pressed and dissolved in 50 ml water and reprecipitated by 200 ml ethanol to give a second precipitate, in the same way as discussed above. This second precipitate was then filtered, pressed and dissolved in 50 ml water and reprecipitated by 200 ml ethanol to give a third precipitate. This third precipitate, was filtered and pressed, and was then washed with acetone to remove any water present in the gum. The acetone washed product was then vacuum dried to give 2.25 g of product (fraction 1 or F1).

Second Extraction

The strained residual yellow mustard seed from the first extraction was placed in a flask with 500 ml of cold (room temperature) distilled water and 2 ml of chloroform. The seed was then stirred in the water using a magnetic stirrer for 7 hours at room temperature. The water containing the extracted material was then strained through a strainer, to remove the gum from the seed to yield about 500 ml of viscous aqueous liquid. This aqueous extract was then treated by addition of 4 volumes of 95% ethanol (2 1), and stirred with a glass rod to recover the gum in a cotton like mass which easily separates from the soluble matter. In this process the precipitated gummy material aligns in the direction of shear to produce a cottony form of the gum. After separation of the gum from the liquid, the cottonlike fibrous appearing mass, was pressed to remove solvent. The gum was then dissolved in 50 ml of water and reprecipitated by 200 ml of ethanol This precipitate was then filtered, pressed and dissolved in 50 ml water and reprecipitated by 200 ml ethanol to give a second precipitate. This second precipitate was then filtered, pressed and dissolved in 50 ml water and reprecipitated by 200 ml ethanol to give a third precipitate. This third precipitate, was filtered and pressed, and was then washed with acetone to remove any water present in the gum. The acetone washed product was then vacuum dried to give 0.75 g of product (fraction 2 or F2).

Third Extraction

The strained residual yellow mustard seed from the second extraction was placed in a flask with 500 ml of cold (room temperature) distilled water and 2 ml of chloroform. The seed was then stirred in the water using a magnetic stirrer for 17 hours at room temperature. The water containing the extracted material was then strained through a strainer, to remove the gum from the seed to yield about 500 ml of viscous aqueous liquid. This aqueous extract was then treated by addition of 4 volumes of 95% ethanol (2 1), and stirred with a glass rod to recover the gum in a cotton like mass which easily separates from the soluble matter. In this process the precipitated gummy material aligns in the direction of shear to produce a cottony form of the gum. After separation of the gum from the liquid, the cottonlike fibrous appearing mass, was pressed to remove solvent. The gum was then dissolved in 50 ml of water and reprecipitated by 200 ml of ethanol. This precipitate was then filtered, pressed and dissolved in 50 ml water and reprecipitated by 200 ml ethanol to give a second precipitate. This second precipitate was then filtered, pressed and dissolved in 50 ml water and reprecipitated by 200 ml ethanol to give a third precipitate. The third precipitate, was filtered and pressed, and was then washed with acetone to remove any water present in the gum. The acetone washed product was then vacuum dried to give 0.54 g of product (fraction 3 or Fourth Extraction The strained residual yellow mustard seed was placed in a flask with 500 ml of cold (room temperature) distilled water and 2 ml of chloroform. The seed was then stirred in the water using a magnetic stirrer for 24 hours at room temperature. The water containing the extracted material was then strained through a strainer, to remove the gum from the seed to yield about 500 ml of viscous aqueous liquid. This aqueous extract was then treated by addition of 4 volumes of 95% ethanol (2 1), and stirred with a glass rod to recover the gum in a cotton like mass which easily separates from the soluble matter. In this process the precipitated gummy material aligns in the direction of shear to produce a cottony form of the gum. After separation of the gum from the liquid, the cottonlike fibrous appearing mass, was pressed to remove solvent. The gum was then dissolved in 50 ml of water and reprecipitated by 200 ml of ethanol. The precipitate was then filtered, pressed and dissolved in 50 ml water and reprecipitated by 200 ml ethanol to give a second precipitate. This second precipitate was then filtered, pressed and dissolved in 50 ml water and reprecipitated by 200 ml ethanol to give a third precipitate. The third precipitate, was filtered and pressed, and was then washed with acetone to remove any water present in the gum. The acetone washed product was then vacuum dried to give 0.45 g of product (fraction 4 or F4).

In this experiment each aqueous extract, was replaced with an equal volume of water to maintain the water:-dried seed ratio at approximately 7:1.

Experiment 2: Alternative Extraction of Gum

The identical procedure to experiment 1, first extraction step was followed with the additional step of first preheating the seeds with steam for 10 minutes, before adding the boiling water, a gum was obtained in practically identical yield to that of experiment 1, first extraction step.

In the following experiments, the centrifuge was a Braun Juice Extractor KMZ 3 (either the KM32/321 or MX 32 version is suitable). The strainer, or basket, is a corrugated cylinder with vertical slits at the outer apices of the corrugations, this arrangement does not allow seed to plug the slits, and separation of the viscous extract presents no difficulty. As would be appreciated by those skilled in the art, any centrifuge adapted for juice extraction, with a perforated, or slitted bowl, or equivalent strainer element would be suitable for use in the process of the invention. Equivalent conventional mechanical strainers, as would be appreciated by those skilled in the art, can be substituted for the centrifuges noted above.

Experiment 3: Mechanical Industrial Extraction of Gum using a Perforated Centrifuge 200 g of distilled water at 65° C., was added to 100 g of dried yellow mustard seed in a flask, this was 10° C. higher than the extraction temperature, which resulted in fast equilibrium of the seed-water mixture at 55° C. The temperature was maintained at 55° C. for 10 min., with occasional hand shaking. The mixture was then passed through a perforated centrifuge and about 100 ml of thick gummy solution separated from the seed, which remained in the centrifuge basket. The seed was replaced in the container, 100 g of distilled water at 65° C. was added, allowed to equilibrate to 55° C., and maintained at 55° C. for 10 min., with occasional hand shaking, the mixture was separated as described previously. The seed was extracted a third and fourth time as described previously. The collected extracts were then combined, filtered through a synthetic filter to remove any solid contaminants. The gum was precipitated by addition of 4 volumes of 85% ethanol, washed and dried in an oven at 75° C., to yield 4.25 g of gum (TC55).

In this experiment each extract was replaced with an equal volume of water to maintain the water:dried seed ratio at approximately 2:1.

In experiments 4 to 6, the extraction water had an initial temperature 10° C. greater than the extraction temperature to allow for fast equibrilation of the seed-water mixture at the extraction temperature.

Experiment 4: Mechanical Industrial Extraction of Gum using a Perforated Centrifuge The method of experiment 3 was repeated at 65° C., to yield 4.0 g of gum (TC65).

Experiment 5: Mechanical Industrial Extraction of Gum using a Perforated Centrifuge The method of experiment 8 was repeated at 75° C., to yield 4.2 g of gum (TC75).

Experiment 6: Mechanical Industrial Extraction of Gum using a Perforated Centrifuge The method of experiment 3 was repeated at 85° C., to yield 4.0 g of gum (TC85).

Experiment 7: Mechanical Industrial Extraction of Gum using a Perforated Centrifuge 300 g of distilled water, at 100° C., was added to 100 g of dried yellow mustard seed in a flask, and maintained at 100° C. for 2.5 min. The mixture was then passed through a perforated centrifuge and about 200 ml of thick gummy solution separated from the seed, which remained in the centrifuge basket. The seed was replaced in the container 200 g of distilled water at 100° C. was added, and maintained at 100° C. for 2.5 min., with occasional hand shaking, the mixture was separated as described previously. The collected extracts were then combined, filtered through a synthetic filter to remove any solid contaminants. The gum was precipitated by addition of 4 volumes of 85% ethanol, washed and dried in an oven at 75° C., to yield 4.0 g of gum (TC100).

In this experiment each extract was replaced with an equal volume of water to maintain the water:dried seed ratio at approximately 3:1.

Experiment 8: Mechanical Industrial Extraction of Gum using a Perforated Centrifuge 200 g of distilled water, at 25° C., was added to 100 g of dried yellow mustard seed in a flask, and maintained at 25° C. for 30 min., with occasional hand shaking. The mixture was then passed through a perforated centrifuge and about 100 ml of thick gummy solution separated from the seed, which remained in the centrifuge basket. The seed was replaced in the container 100 g of distilled water at 25° C. was added, and maintained at 25° C. for 10 min., with occasional hand shaking, the mixture was separated as described previously. The seed was extracted a further nine times with 100 g water at 25° C. for 10 min. each time. The collected extracts were then combined, filtered through a synthetic filter to remove any solid contaminants. The gum was precipitated by addition of 4 volumes of 85% ethanol, washed and dried in an oven at 75° C., to yield 4.1 g of gum (TC25).

In this experiment each extract was replaced with an equal volume of water to maintain the water:dried seed ratio at approximately 2:1.

Experiment 9: Mechanical Industrial Extraction of Gum using a Perforated Centrifuge The method of experiment 8 was repeated, the combined extracts, were then heated at 65° C. for 30 min., before precipitating the gum by addition of 4 volumes of 85% ethanol, washed and dried in an oven at 75° C., to yield 4.1 g of gum (TC25+H).

Experiment 10: Mechanical Industrial Extraction of Gm using a Perforated Centrifuge 200 g of distilled water, at 25° C., was added to 100 g of dried yellow mustard seed in a container, and heated in a microwave oven for 3 min. attaining a temperature of 85° C. The mixture was then passed through a perforated centrifuge and about 100 ml of thick gummy solution separated from the seed, which remained in the centrifuge basket. The seed was replaced in the container 100 g of distilled water at 25° C. was added, and the container replaced in the microwave oven, and heated for 3 min. The mixture was again separated as described previously. The seed was extracted a third time as described previously. The collected extracts were then combined, filtered through a synthetic filter to remove any solid contaminants. The gum was precipitated by addition of 4 volumes of 85% ethanol:15% methanol, washed and dried in an oven at 75° C., to yield 4.0 g of gum (MT85).

In this experiment each extract was replaced with an equal volume of water to maintain the water:dried seed ratio at approximately 2:1.

CHEMICAL ANALYSIS OF GUMS

Protein Analysis of F1, F2, F3, F4

Each extract was analyzed for protein using the method of Lowry et al. [J. Biol. Chem. (1951) 193, 265].

Monosaccharide Hydrolysis of F1, F2, F8, F4,

The extracts were hydrolyzed to monosaccharides using a modified version of Saeman et al. [TAPPI (1954) 37, 336]. The gum fractions F1, F2, F3, F4, 5 to 10 mg each, were hydrolyzed by aqueous 72% sulfuric acid (0.2 ml) under nitrogen gas in a closed test tube for 1 hour at room temperature, the acid was diluted to 1M then heated at 100° C., on a water bath for 2 hours under nitrogen gas. The hydrolyzate was then neutralized with finely powdered CaO using the exact amount required to neutralize the sulfuric acid, and pH measurements were taken to allow complete neutralization of the hydrolyzate. A calcium sulfate milky suspension was produced. The test tube was then vibrated to mix the contents thoroughly, and the test tube centrifuged. The top liquid layer was removed, 2 ml of water was added to the test tube, which was then vibrated again, centrifuged again, and the top liquid layer removed. This process was repeated four times. The combined liquid layers of sugar solutions were collected in a rotary vacuum drier, and concentrated with the addition of ethanol as a water evaporation aid. The concentrated sugars were collected and 0.5 ml placed in a double chamber test tube for freeze drying.

Methylation of Monosaccharide Mixtures

The freeze dried sugars were methylated following the method of Honda et al. [J. Chromatography, (1979) 169, 287], 20 ul ethanethiol-trifluoroacetic acid (2:1, v/v) was added to the residue in a reaction tube, which was then closed tightly with polyethylene stopper and kept for 10 min at 25° C. Pyridine (50 ul), hexamethylenedisilazane (100 ul), and trimethylchlorosilane (50 ul), and the mixture incubated for 30 min at 50° C., with occasional shaking. The mixture was then centrifuged, and 1 ul of the supernatant analyzed by gas liquid chromatography. A mixture of standard sugars were treated in the identical manner, as a standard.

Gas Liquid Chromatography of Methylated Monosaccharide Mixtures

The gas liquid chromatography of the methylated monosaccharide mixtures was performed with a Sigma column (0.314 mm I.D., 30 m long, SM 30). An initial temperature of 200° C. for 25 min, followed by 210° C. for 15 min, with a ramp temperature of 10° C./min, was established for peak separation. Peak areas were determined by HP computing integrator. The flow rate of the carrier gas was regulated at 1 ml/min by use of a 100/1 splitter. The eluate was continuously mixed with the scavenger gas (nitrogen) 138 ml/min and the mixture was introduced into the detector.

VISCOSITY MEASUREMENTS OF GUMS

Shear sweep, and viscosity of solutions of the gums F1, F2, F3, F4, TC25, TC65, MT85 and xanthan gum were measured at various concentrations in water using a Bohlin Rheometer System.

The data in Tables II to V was used to plot FIGS. 1 to 4, and was taken at 25° C., and 0.5% concentration with a Bohlin Rheometer System, with torque element 93.2 g-cm, initial delay time 2 seconds, constant delay time 5 seconds, sensitivity 1x, integration time 2 seconds, and measurement interval 82 seconds. Exponential figures are used, e.g. 3.682E-2 is 0.03682. The variation in shear rate is the same in all tables and is increased to a maximum and then decreased.

The data in Tables VI to IX was used to plot FIGS. 5 to 8, and was taken at 25° C., and 0.3% concentration in a Bohlin Rheometer System, with torque element 91.4 g-cm, initial delay time 2 seconds, constant delay time 5 seconds. sensitivity 1x, integration time 10 seconds, and measurement interval 100 seconds. Exponential figures are used. The variation in shear rate is the same in all tables and is increased to a maximum and then decreased.

Heat extracted seed was found to have a sweet pleasant taste, while cold extracted seed had an associated bitter taste, presumably caused by natural toxins present.

TABLE II

| MUSTARD GUM F1 VISCOSITY DATA | | |
|---|---|---|
| SHEAR RATE 1/s | SHEAR STRESS Pa | VISCOSITY Pas |
| 3.682E−2 | 1.661E−1 | 4.511E+0 |
| 5.833E−2 | 7.023E−1 | 1.204E+1 |
| 9.246E−2 | 1.210E+0 | 1.309E+0 |
| 1.465E−1 | 1.125E+0 | 7.679E+0 |
| 2.326E−1 | 1.172E+0 | 5.041E+0 |
| 3.686E−1 | 1.217E+0 | 3.302E+0 |
| 5.833E−1 | 1.288E+0 | 2.208E+0 |
| 9.232E−1 | 1.428E+0 | 1.547E+0 |
| 1.467E+0 | 1.479E+0 | 1.008E+0 |
| 2.322E+0 | 1.544E+0 | 6.650E−1 |
| 3.682E+0 | 1.559E+0 | 4.234E−1 |
| 5.833E+0 | 1.868E+0 | 3.202E−1 |
| 9.246E+0 | 2.051E+0 | 2.218E−1 |
| 1.465E+1 | 2.138E+0 | 1.459E−1 |
| 2.326E+1 | 2.461E+0 | 1.058E−1 |
| 3.686E+1 | 2.828E+0 | 7.672E−2 |
| 5.833E+1 | 3.289E+0 | 5.638E−2 |
| 9.232E+1 | 3.921E+0 | 4.247E−2 |
| 1.467E+2 | 4.677E+0 | 3.188E−2 |
| 2.322E+2 | 5.875E+0 | 2.530E−2 |
| 3.682E+2 | 7.714E+0 | 2.095E−2 |
| 5.833E+2 | 1.044E+1 | 1.789E−2 |
| 9.246E+2 | 1.452E+1 | 1.570E−2 |
| 5.833E+2 | 1.023E+1 | 1.754E−2 |
| 3.682E+2 | 7.419E+0 | 2.015E−2 |
| 2.322E+2 | 5.626E+0 | 2.423E−2 |
| 1.467E+2 | 4.508E+0 | 3.073E−2 |
| 9.232E+1 | 3.739E+0 | 4.050E−2 |
| 5.833E+1 | 3.186E+0 | 5.462E−2 |
| 3.686E+1 | 2.590E+0 | 7.029E−2 |
| 2.326E+1 | 2.258E+0 | 9.709E−2 |
| 1.465E+1 | 2.121E+0 | 1.448E−1 |

TABLE II-continued
MUSTARD GUM F1 VISCOSITY DATA

| SHEAR RATE 1/s | SHEAR STRESS Pa | VISCOSITY Pas |
|---|---|---|
| 9.246E+0 | 2.027E+0 | 2.192E−1 |
| 5.833E+0 | 1.786E+0 | 3.062E−1 |
| 3.682E+0 | 1.585E+0 | 4.304E−1 |
| 2.322E+0 | 1.516E+0 | 6.527E−1 |
| 1.467E+0 | 1.430E+0 | 9.747E−1 |
| 9.232E−1 | 1.337E+0 | 1.448E+0 |
| 5.833E−1 | 1.303E+0 | 2.234E+0 |
| 3.686E−1 | 1.230E+0 | 3.337E+0 |
| 2.326E−1 | 1.206E+0 | 5.185E+0 |
| 1.465E−1 | 1.151E+0 | 7.858E+0 |
| 9.246E−2 | 1.151E+0 | 1.245E+1 |
| 5.833E−2 | 1.124E+0 | 1.927E+1 |
| 3.682E−2 | 1.103E+0 | 2.996E+1 |

TABLE III
MUSTARD GUM F2 VISCOSITY DATA

| SHEAR RATE 1/s | SHEAR STRESS Pa | VISCOSITY Pas |
|---|---|---|
| 3.682E−2 | 3.512E−1 | 9.538E+0 |
| 5.888E−2 | 6.510E−1 | 1.116E+1 |
| 9.246E−2 | 1.376E+0 | 1.488E+1 |
| 1.465E−1 | 1.541E+0 | 1.051E+1 |
| 2.326E−1 | 1.631E+0 | 7.013E+0 |
| 3.686E−1 | 1.782E+0 | 4.834E+0 |
| 5.833E−1 | 1.826E+0 | 3.193E+0 |
| 9.232E−1 | 2.010E+0 | 2.177E+0 |
| 1.467E+0 | 2.238E+0 | 1.526E+0 |
| 2.322E+0 | 2.490E+0 | 1.072E+0 |
| 3.682E+0 | 2.650E+0 | 7.196E−1 |
| 5.833E+0 | 2.976E+0 | 5.102E−1 |
| 9.246E+0 | 3.265E+0 | 3.532E−1 |
| 1.465E+1 | 3.555E+0 | 2.426E−1 |
| 2.326E+1 | 3.801E+0 | 1.634E−1 |
| 3.686E+1 | 4.387E+0 | 1.190E−1 |
| 5.833E+1 | 5.122E+0 | 8.781E−2 |
| 9.232E+1 | 6.072E+0 | 6.577E−2 |
| 1.467E+2 | 7.308E+0 | 4.981E−2 |
| 2.322E+2 | 8.994E+0 | 3.873E−2 |
| 3.682E+2 | 1.118E+1 | 3.036E−2 |
| 5.833E+2 | 1.412E+1 | 2.421E−2 |
| 9.246E+2 | 1.895E+1 | 2.049E−2 |
| 5.833E+2 | 1.394E+1 | 2.390E−2 |
| 3.682E+2 | 1.064E+1 | 2.889E−2 |
| 2.322E+2 | 8.242E+0 | 3.549E−2 |
| 1.467E+2 | 6.617E+0 | 4.510E−2 |
| 9.232E+1 | 5.408E+0 | 5.858E−2 |
| 5.833E+1 | 4.503E+0 | 7.720E−2 |
| 3.686E+1 | 3.783E+0 | 1.026E−1 |
| 2.326E+1 | 3.271E+0 | 1.406E−1 |
| 1.465E+1 | 3.382E+0 | 2.308E−1 |
| 9.246E+0 | 3.111E+0 | 3.364E−1 |
| 5.833E+0 | 2.815E+0 | 4.827E−1 |
| 3.682E+0 | 2.544E+0 | 6.910E−1 |
| 2.322E+0 | 2.382E+0 | 1.026E+0 |
| 1.467E+0 | 2.217E+0 | 1 511E+0 |
| 9.232E−1 | 2.100E+0 | 2.275E+0 |
| 5.833E−1 | 1.981E+0 | 3.396E+0 |
| 3.686E−1 | 1.911E+0 | 5.184E+0 |
| 2.326E−1 | 1.864E+0 | 8.014E+0 |
| 1.465E−1 | 1.754E+0 | 1.197E+1 |
| 9.246E−2 | 1.769E+0 | 1.913E+1 |
| 5.833E−2 | 1.620E+0 | 2.778E+1 |
| 3.682E−2 | 1.608E+0 | 4.366E+1 |

TABLE IV
MUSTARD GUM F3 VISCOSITY DATA

| SHEAR RATE 1/s | SHEAR STRESS Pa | VISCOSITY Pas |
|---|---|---|
| 3.682E−2 | 1.305E−1 | 3.545E+0 |
| 5.833E−2 | 2.982E−1 | 5.113E+0 |
| 9.246E−2 | 3.824E−1 | 4.135E+0 |
| 1.465E−1 | 4.643E−1 | 3.169E+0 |
| 2.326E−1 | 6.455E−1 | 2.775E+0 |
| 3.686E−1 | 7.845E−1 | 2.129E+0 |
| 5.833E−1 | 9.338E−1 | 1.601E+0 |
| 9.232E−1 | 1.094E+0 | 1.185E+0 |
| 1.467E+0 | 1.232E+0 | 8.398E−1 |
| 2.322E+0 | 1.361E+0 | 2.834E−1 |
| 3.682E+0 | 1.525E+0 | 4.141E−1 |
| 5.833E+0 | 1.805E+0 | 3.095E−1 |
| 9.246E+0 | 2.080E+0 | 2.250E−1 |
| 1.465E+1 | 2.376E+0 | 1.621E−1 |
| 2.326E+1 | 2.827E+0 | 1.215E−1 |
| 3.686E+1 | 3.338E+0 | 9.056E−2 |
| 5.833E+1 | 3.984E+0 | 6.830E−2 |
| 9.232E+1 | 4.760E+0 | 5.156E−2 |
| 1.467E+2 | 5.797E+0 | 3.952E−2 |
| 2.322E+2 | 7.127E+0 | 3.069E−2 |
| 3.682E+2 | 8.969E+0 | 2.436E−2 |
| 5.833E+2 | 1.168E+1 | 2.002E−2 |
| 9.246E+2 | 1.518E+1 | 1.641E−2 |
| 5.833E+2 | 1.140E+1 | 1.614E−2 |
| 3.682E+2 | 8.728E+0 | 2.371E−2 |
| 2.322E+2 | 6.819E+0 | 2.936E−2 |
| 1.467E+2 | 5.409E+0 | 3.678E−2 |
| 9.232E+1 | 4.334E+0 | 4.695E−2 |
| 5.833E+1 | 3.519E+0 | 6.033E−2 |
| 3.686E+1 | 2.864E+0 | 7.772E−2 |
| 2.326E+1 | 2.335E+0 | 1.004E−1 |
| 1.465E+1 | 1.909E+0 | 1.303E−1 |
| 9.246E+0 | 1.546E+0 | 1.672E−1 |
| 5.833E+0 | 1.283E+0 | 2.199E−1 |
| 3.682E+0 | 1.053E+0 | 2.860E−1 |
| 2.322E+0 | 8.916E−1 | 3.839E−1 |
| 1.467E+0 | 7.257E−1 | 4.946E−1 |
| 9.232E−1 | 5.498E−1 | 6.443E−1 |
| 5.833E−1 | 4.701E−1 | 8.060E−1 |
| 3.686E−1 | 3.795E−1 | 1.030E+0 |
| 2.326E−1 | 3.068E−1 | 1.319E+0 |
| 1.465E−1 | 1.723E−1 | 1.176E+0 |
| 9.246E−2 | 1.243E−1 | 1.344E+0 |
| 5.833E−2 | 8.549E−2 | 1.466E+0 |
| 3.682E−2 | 4.815E−2 | 1.308E+0 |

TABLE V
MUSTARD GUM F4 VISCOSITY DATA

| SHEAR RATE 1/s | SHEAR STRESS Pa | VISCOSITY Pas |
|---|---|---|
| 3.682E−2 | 5.543E−3 | 1.505E−1 |
| 5.833E−2 | 8.309E−2 | 1.425E+0 |
| 9.246E−2 | 1.209E−1 | 1.308E+0 |
| 1.465E−1 | 1.439E−1 | 9.818E−0 |

TABLE V-continued
MUSTARD GUM F4 VISCOSITY DATA

| SHEAR RATE 1/s | SHEAR STRESS Pa | VISCOSITY Pas |
|---|---|---|
| 2.326E−1 | 2.571E−1 | 1.105E+0 |
| 3.686E−1 | 3.010E−1 | 8.168E−1 |
| 5.833E−1 | 3.372E−1 | 5.781E−1 |
| 9.232E−1 | 3.674E−1 | 3.979E−1 |
| 1.467E+0 | 4.283E−1 | 2.919E−1 |
| 2.322E+0 | 5.108E−1 | 2.200E−1 |
| 3.682E+0 | 6.468E−1 | 1.757E−1 |
| 5.833E+0 | 7.363E−1 | 1.262E−1 |
| 9.246E+0 | 8.915E−1 | 9.641E−2 |
| 1.465E+1 | 1.102E+0 | 7.519E−2 |
| 2.326E+1 | 1.288E+0 | 5.537E−2 |
| 3.686E+1 | 1.606E+0 | 4.538E−2 |
| 5.833E+1 | 2.007E+0 | 3.441E−2 |
| 9.232E+1 | 2.513E+0 | 2.772E−2 |
| 1.467E+2 | 3.193E+0 | 2.176E−2 |
| 2.322E+2 | 4.094E+0 | 1.763E−2 |
| 3.682E+2 | 5.389E+0 | 1.464E−2 |
| 5.833E+2 | 7.184E+0 | 1.232E−2 |
| 9.246E+2 | 9.652E+0 | 1.044E−2 |
| 5.833E+2 | 7.048E+0 | 1.208E−2 |
| 3.682E+2 | 5.263E+0 | 1.429E−2 |
| 2.322E+2 | 3.992E+0 | 1.719E−2 |
| 1.467E+2 | 3.073E+0 | 2.094E−2 |
| 9.232E+1 | 2.413E+0 | 2.613E−2 |
| 5.833E+1 | 1.911E+0 | 3.227E−2 |
| 3.686E+1 | 1.508E+0 | 4.092E−2 |
| 2.326E+1 | 1.179E+0 | 5.070E−2 |
| 1.465E+1 | 9.337E−1 | 6.372E−2 |
| 9.246E+0 | 7.453E−1 | 8.060E−2 |
| 5.833E+0 | 6.123E−1 | 1.050E−1 |
| 3.682E+0 | 4.906E−1 | 1.332E−1 |
| 2.322E+0 | 4.209E−1 | 1.812E−1 |
| 1.467E+0 | 3.377E−1 | 2.302E−1 |
| 9.232E−1 | 2.593E−1 | 2.808E−1 |
| 5.833E−1 | 1.748E−1 | 2.998E−1 |
| 3.686E−1 | 1.430E−1 | 3.879E−1 |
| 2.326E−1 | 1.039E−1 | 4.466E−1 |
| 1.465E−1 | 3.182E−2 | 2.606E−1 |
| 9.246E−2 | 1.944E−2 | 2.102E−1 |
| 5.833E−2 | 5.320E−3 | 9.121E−2 |
| 3.682E−2 | 1.548E−2 | 4.205E−1 |

TABLE VI
MUSTARD GUM TC25 VISCOSITY DATA

| SHEAR RATE 1/s | SHEAR STRESS Pa | VISCOSITY Pas |
|---|---|---|
| 7.335E−1 | 1.687E−1 | 2.300E−1 |
| 1.163E+0 | 1.830E−1 | 1.574E−1 |
| 1.846E+0 | 1.980E−1 | 1.072E−1 |
| 2.923E+0 | 2.364E−1 | 8.086E−2 |
| 4.634E+0 | 2.434E−1 | 5.252E−2 |
| 7.343E+0 | 2.864E−1 | 3.901E−2 |
| 1.164E+1 | 3.273E−1 | 2.812E−2 |
| 1.861E+1 | 3.524E−1 | 1.894E−2 |
| 2.934E+1 | 4.228E−1 | 1.461E−2 |
| 4.616E+1 | 5.358E−1 | 1.161E−2 |
| 7.335E+1 | 7.004E−1 | 9.549E−3 |
| 1.163E+2 | 9.202E−1 | 7.913E−3 |
| 1.846E+2 | 1.263E+0 | 6.839E−3 |
| 2.923E+2 | 1.730E+0 | 5.918E−3 |
| 4.634E+2 | 2.427E+0 | 5.237E−3 |
| 7.343E+2 | 3.513E+0 | 4.784E−3 |
| 1.164E+3 | 5.146E+0 | 4.421E−3 |
| 7.343E+2 | 3.371E+0 | 4.591E−3 |
| 4.634E+2 | 2.313E+0 | 4.991E−3 |
| 2.923E+2 | 1.629E+0 | 5.573E−3 |
| 1.846E+2 | 1.177E+0 | 6.375E−3 |
| 1.163E+2 | 8.625E−1 | 7.416E−3 |
| 7.335E+1 | 6.492E−1 | 8.851E−3 |
| 4.616E+1 | 5.030E−1 | 1.090E−2 |
| 2.934E+1 | 4.086E−1 | 1.393E−2 |
| 1.861E+1 | 3.449E−1 | 1.853E−2 |
| 1.164E+1 | 3.589E−1 | 3.084E−2 |
| 7.343E+0 | 3.164E−1 | 4.309E−2 |

TABLE VI-continued
MUSTARD GUM TC25 VISCOSITY DATA

| SHEAR RATE 1/s | SHEAR STRESS Pa | VISCOSITY Pas |
|---|---|---|
| 4.634E+0 | 2.823E−1 | 6.091E−2 |
| 2.923E+0 | 2.446E−1 | 8.366E−2 |
| 1.846E+0 | 2.249E−1 | 1.218E−1 |
| 1.163E+0 | 2.084E−1 | 1.792E−1 |
| 7.335E−1 | 2.031E−1 | 2.769E−1 |

TABLE VII
MUSTARD GUM TC65 VISCOSITY DATA

| SHEAR RATE 1/s | SHEAR STRESS Pa | VISCOSITY Pas |
|---|---|---|
| 7.335E−1 | 1.407E−1 | 1.918E−1 |
| 1.163E+0 | 1.988E−1 | 1.710E−1 |
| 1.846E+0 | 2.531E−1 | 1.371E−1 |
| 2.923E+0 | 3.396E−1 | 1.162E−1 |
| 4.634E+0 | 4.145E−1 | 8.945E−2 |
| 7.343E+0 | 5.184E−1 | 7.060E−2 |
| 1.164E+1 | 6.407E−1 | 5.504E−2 |
| 1.861E+1 | 7.606E−1 | 4.078E−2 |
| 2.934E+1 | 9.593E−1 | 3.270E−2 |
| 4.616E+1 | 1.179E+0 | 2.555E−2 |
| 7.335E+1 | 1.483E+0 | 2.022E−2 |
| 1.163E+2 | 1.906E+0 | 1.639E−2 |
| 1.846E+2 | 2.438E+0 | 1.321E−2 |
| 2.923E+2 | 3.167E+0 | 1.083E−2 |
| 4.634E+2 | 4.219E+0 | 9.104E−3 |
| 7.343E+2 | 5.727E+0 | 7.800E−3 |
| 1.164E+3 | 7.878E+0 | 6.768E−3 |
| 7.343E+2 | 5.671E+0 | 7.723E−3 |
| 4.634E+2 | 4.207E+0 | 9.078E−3 |
| 2.923E+2 | 3.171E+0 | 1.085E−2 |
| 1.846E+2 | 2.432E+0 | 1.317E−2 |
| 1.163E+2 | 1.895E+0 | 1.630E−2 |
| 7.335E+1 | 1.481E+0 | 2.019E−2 |
| 4.616E+1 | 1.182E+0 | 2.561E−2 |
| 2.934E+1 | 9.557E−1 | 3.257E−2 |
| 1.861E+1 | 7.716E−1 | 4.147E−2 |
| 1.164E+1 | 7.039E−1 | 6.047E−2 |
| 7.343E+0 | 5.986E−1 | 8.152E−2 |
| 4.634E+0 | 4.924E−1 | 1.063E−1 |
| 2.923E+0 | 4.161E−1 | 1.423E−1 |
| 1.846E+0 | 3.916E−1 | 2.121E−1 |
| 1.163E+0 | 3.169E−1 | 2.725E−1 |
| 7.335E−1 | 2.857E−1 | 3.895E−1 |

TABLE VIII
MUSTARD GUM MT85 VISCOSITY DATA

| SHEAR RATE 1/s | SHEAR STRESS Pa | VISCOSITY Pas |
|---|---|---|
| 7.335E−1 | 3.660E−1 | 4.990E−1 |
| 1.163E+0 | 3.882E−1 | 3.338E−1 |
| 1.846E+0 | 4.050E−1 | 2.194E−1 |
| 2.923E+0 | 4.758E−1 | 1.627E−1 |
| 4.634E+0 | 5.428E−1 | 1.171E−1 |
| 7.343E+0 | 6.344E−1 | 8.640E−2 |
| 1.164E+1 | 7.184E−1 | 6.172E−2 |
| 1.861E+1 | 8.436E−1 | 4.322E−2 |
| 2.934E−1 | 9.683E−1 | 3.300E−2 |
| 4.616E+1 | 1.175E+0 | 2.546E−2 |
| 7.335E+2 | 1.429E+0 | 1.948E−2 |
| 1.163E+2 | 1.786E+0 | 1.535E−2 |
| 1.846E+2 | 2.275E+0 | 1.232E−2 |
| 2.923E+2 | 2.952E+0 | 1.010E−2 |
| 4.634E+2 | 3.935E+0 | 8.492E−3 |
| 7.343E+2 | 5.333E+0 | 7.263E−3 |
| 1.164E+3 | 7.329E+0 | 6.297E−3 |
| 7.343E+2 | 5.296E+0 | 7.213E−3 |
| 4.634E+2 | 3.934E+0 | 8.489E−3 |
| 2.923E+2 | 2.979E+0 | 1.019E−2 |
| 1.846E+2 | 2.296E+0 | 1.244E−2 |
| 1.163E+2 | 1.806E+0 | 1.553E−2 |

TABLE VIII-continued
MUSTARD GUM MT85 VISCOSITY DATA

| SHEAR RATE 1/s | SHEAR STRESS Pa | VISCOSITY Pas |
|---|---|---|
| 7.335E+1 | 1.441E+0 | 1.964E−2 |
| 4.616E+1 | 1.155E+0 | 2.501E−2 |
| 2.934E+1 | 9.525E−1 | 3.246E−2 |
| 1.861E+1 | 7.987E−1 | 4.293E−2 |
| 1.164E+1 | 7.346E−1 | 6.311E−2 |
| 7.343E+0 | 6.344E−1 | 8.640E−2 |
| 4.634E+0 | 5.364E−1 | 1.158E−1 |
| 2.923E+0 | 4.795E−1 | 1.640E−1 |
| 1.846E+0 | 4.140E−1 | 2.242E−1 |
| 1.163E+0 | 3.822E−1 | 3.286E−1 |
| 7.335E−1 | 3.347E−1 | 4.562E−1 |

TABLE IX
XANTHAN GUM VISCOSITY DATA

| SHEAR RATE 1/s | SHEAR STRESS Pa | VISCOSITY Pas |
|---|---|---|
| 7.335E−1 | 1.432E+0 | 1.952E+0 |
| 1.163E+0 | 1.612E+0 | 1.386E+0 |
| 1.846E+0 | 1.820E+0 | 9.858E−1 |
| 2.923E+0 | 2.020E+0 | 6.909E−1 |
| 4.634E+0 | 2.249E+0 | 4.854E−1 |
| 7.343E+0 | 2.500E+0 | 3.404E−1 |
| 1.164E+1 | 2.773E+0 | 2.382E−1 |
| 1.861E+1 | 3.029E+0 | 1.628E−1 |
| 2.934E+1 | 3.346E+0 | 1.140E−1 |
| 4.616E+1 | 3.749E+0 | 8.122E−2 |
| 7.335E+1 | 4.218E+0 | 5.750E−2 |
| 1.163E+2 | 4.820E+0 | 4.145E−2 |
| 1.846E+2 | 5.606E+0 | 3.062E−2 |
| 2.923E+2 | 6.663E+0 | 2.279E−2 |
| 4.634E+2 | 8.063E+0 | 1.740E−2 |
| 7.343E+2 | 1.001E+1 | 1.363E−2 |
| 1.164E+3 | 1.265E+0 | 1.086E−2 |
| 7.343E+2 | 1.001E+0 | 1.363E−2 |
| 4.634E+2 | 8.084E+0 | 1.745E−2 |
| 2.923E+2 | 6.667E+0 | 2.281E−2 |
| 1.846E+2 | 5.638E+0 | 3.053E−2 |
| 1.163E+2 | 4.862E+0 | 4.181E−2 |
| 7.335E+1 | 4.250E+0 | 5.792E−2 |
| 4.616E+1 | 3.771E+0 | 8.170E−2 |
| 2.934E+1 | 3.383E+0 | 1.153E−1 |
| 1.861E+1 | 3.057E+0 | 1.643E−1 |
| 1.164E+1 | 2.819E+0 | 2.422E−1 |
| 7.343E+0 | 2.561E+0 | 3.488E−1 |
| 4.634E+0 | 2.310E+0 | 4.984E−1 |
| 2.923E+0 | 2.069E+0 | 7.077E−1 |
| 1.846E+0 | 1.887E+0 | 1.022E+0 |
| 1.163E+0 | 1.675E+0 | 1.440E+0 |
| 7.335E−1 | 1.505E+0 | 2.052E+0 |

Although this invention is described in terms of specific embodiments, it is not limited thereto, as would be understood by those skilled in the art, numerous variations are possible within the scope of the invention as described and claimed in the application, without departing from the scope and nature thereof.

I claim:

1. In a process of water extraction of gum from dried yellow mustard seed, including the steps of
   (a) treating said mustard seed with water
   (b) separating the resulting water extract from said seed, the improvement comprising
   (c) said water being at a temperature in the range from about 55° C. to about 100° C.

2. The process of claim 1, wherein said temperature is about 100° C.

3. The process of claim 2, wherein (a) comprises treating said seed in seed-water mixture at a seed water ratio of about 1:2 5, for about 5 minutes, then subsequently (d) cooling said seed-water mixture to a temperature of about 75° C., and maintaining said seed-water mixture at 75° C., for about 25 minutes, then (e) increasing said seed:water ratio to about 1:7, cooling said seed-water mixture to about 25° C., and maintaining said seed-water mixture at about 25° C. for about 16 hours.

4. The process of claim 2, additionally comprising treating said seed with steam before step (a).

5. The process of claim 4, wherein said seed is treated with steam for about 10 minutes.

6. The process of claim 1, wherein (b) comprises mechanically separating said water extract from said seed, in a perforated centrifuge.

7. The process of claim 6, wherein said temperature is about 55° C.

8. The process of claim 6, wherein said temperature is about 65° C.

9. The process of claim 6, wherein said temperature is about 75° C.

10. The process of claim 6, wherein said temperature is about 85° C.

11. The process of claim 6, wherein (a) comprises treating said seed at a temperature in the range of from about 55° C. to about 85° C., at a seed:water ratio of about 1:2, for about 10 minutes, 12. The process of claim 6, wherein said temperature is about 100° C.

13. The process of claim 12, wherein (a) comprises treating said seed at a seed:water ratio of about 1:3, for about 2.5 minutes.

14. The process of claim 6, wherein (a) comprises treating said seed and water with microwaves.

15. The process of claim 14, wherein (a) comprises treating said seed and water at a seed:water ratio of about 1:2, for about 3 minutes as the temperature is raised to about 85°. C., 16. In a process of water extraction of gum from dried yellow mustard seed, including the steps of
   (a) treating said mustard seed with water
   (b) separating the resulting water extract from said seed, the improvement comprising
   (c) the resulting water extract being heated at a temperature of about 65° C.

17. The process of claim 16, wherein (b) comprises mechanically separating said water extract from said seed, in a perforated centrifuge.

18. The process of claim 17, wherein (a) comprises treating said seed at about 25° C., at a seed:water ratio of about 1:2 for about 30 minutes, wherein and said resultant extract is heated at about 65° C. for about 30 minutes.

19. A yellow mustard seed gum, having pseudoplastic properties in aqueous solution, wherein said gum includes a polysaccharide, having monosaccharide components comprising in order of decreasing concentration glucose, galactose, mannose, arabinose, with rhamnose and xylose approximately equal in concentration but less than arabinose.

20. The gum of claim 19, said polysaccharide having a monosaccharide composition by weight, of xylose 3.03 to 3.67%, rhamnose 3.38 to 3.85%, arabinose 5.27 to 7.02%, mannose 10.43 to 10.72%, galactose 31.47 to 33.29%, and glucose 42.23 to 45.53%.

* * * * *